(12) United States Patent
Matano et al.

(10) Patent No.: US 7,013,062 B1
(45) Date of Patent: Mar. 14, 2006

(54) MATERIAL FOR THERMAL COMPENSATION AND OPTICAL COMMUNICATION DEVICE USING THE MATERIAL

(75) Inventors: Takahiro Matano, Shiga (JP); Akihiko Sakamoto, Shiga (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/914,116

(22) PCT Filed: Feb. 9, 2000

(86) PCT No.: PCT/JP00/00714

§ 371 (c)(1),
(2), (4) Date: Aug. 23, 2001

(87) PCT Pub. No.: WO00/50360

PCT Pub. Date: Aug. 31, 2000

(30) Foreign Application Priority Data

| Feb. 24, 1999 | (JP) | ................................. 11/047022 |
| Mar. 1, 1999 | (JP) | ................................. 11/052780 |
| Mar. 1, 1999 | (JP) | ................................. 11/052793 |
| Nov. 24, 1999 | (JP) | ................................. 11/332577 |

(51) Int. Cl.
*G02B 6/00* (2006.01)

(52) U.S. Cl. ............................. 385/31; 385/24; 385/37; 65/30.1

(58) Field of Classification Search ................. 385/24, 385/37, 141, 31
See application file for complete search history.

(56) References Cited

U.S. PATENT DOCUMENTS

| 5,694,503 | A | * | 12/1997 | Fleming et al. ............... 385/37 |
| 5,721,802 | A | | 2/1998 | Francis et al. |
| 5,926,599 | A | | 7/1999 | Bookbinder et al. |
| 6,209,352 | B1 | * | 4/2001 | Beall et al. .................. 65/30.1 |
| 6,258,743 | B1 | * | 7/2001 | Fleming et al. ............. 501/102 |
| 6,307,657 | B1 | * | 10/2001 | Ford .............................. 398/9 |

FOREIGN PATENT DOCUMENTS

| EP | 0 812 810 | 12/1997 |
| JP | 63201034 | 8/1988 |
| JP | 1-246177 | 10/1989 |
| JP | 1246177 | 10/1989 |
| JP | 10-1359 | 1/1998 |
| JP | 10001359 | 1/1998 |
| WO | WO 97/28480 | 8/1997 |

OTHER PUBLICATIONS

Weidmann et al "A novel negative expansion substrate for athermalizing fiber bragg gratings", Proceedings ecoe '96 Oslo, vol. 1, p. 61-64, Sep. 15, 1996.
European Search Report.

* cited by examiner

*Primary Examiner*—Michelle Connelly-Cushwa
*Assistant Examiner*—Eric Wong
(74) *Attorney, Agent, or Firm*—Collard & Roe, P.C.

(57) ABSTRACT

A material for temperature compensation consists of a sinter produced by baking any of crystalline powder, crystallized glass powder, and partially crystalline glass powder. The sinter has a negative coefficient of thermal expansion and contains anisotropic crystals in terms of thermal expansion.

23 Claims, 1 Drawing Sheet

MATERIAL FOR THERMAL COMPENSATION AND OPTICAL COMMUNICATION DEVICE USING THE MATERIAL

TECHNICAL FIELD

This invention relates to a temperature compensation member having a negative coefficient of thermal expansion and an optical communication device using the same.

BACKGROUND ART

With the advance of the optical communication technology, a network using optical fibers has been rapidly built up. In the network, a wavelength multiplexing technique of collectively transmitting light beams having a plurality of different wavelengths has come into use, and a wavelength filter, a coupler, a waveguide, and the like have become important devices.

Some of the devices of the type described are changed in characteristics depending upon the temperature and may therefore cause troubles if used in the outdoors. This requires a technique for keeping the characteristics of these devices fixed or unchanged regardless of a temperature change, i.e., a so-called temperature compensation technique.

As a typical optical communication device which requires temperature compensation, there is a fiber Bragg grating (hereinbelow referred to as FBG). The FBG is a device in which a portion varied in refractive index in a grating-like pattern, i.e., a so-called grating is formed within a core of an optical fiber, and has a characteristic of reflecting a light beam having a specific wavelength according to the relationship represented by the following formula (1). Therefore, the device attracts attention as an important optical device in the optical communication system using a wavelength division multiplex transmission technique in which optical signals different in wavelength are multiplexed and transmitted through a single optical fiber.

$$\lambda = 2n\Lambda \qquad (1)$$

Herein, $\lambda$ represents a reflection wavelength, n, an effective refractive index of the core, and $\Lambda$, a grating period of the portion varied in refractive index in the grating-like pattern.

However, the above-mentioned FBG has a problem that the reflection wavelength will be varied following the change in ambient temperature. The temperature dependence of the reflection wavelength is represented by the following formula (2) which is obtained by differentiating the formula 1 with the temperature T.

$$\partial\lambda/\partial T = 2[(\partial n/\partial T)\Lambda + n(\partial\Lambda/\partial T)] = 2\Lambda[(\partial n/\partial T) + n(\partial\Lambda/\partial T)/\Lambda] \qquad (2)$$

The second term of the right side of the formula (2), i.e., $(\partial\Lambda/\partial T)/\Lambda$ corresponds to a coefficient of thermal expansion of the optical fiber and has a value approximately equal to $0.6\times10^{-6}/°C$. On the other hand, the first term of the right side corresponds to the temperature dependency of the refractive index of the core of the optical fiber and has a value approximately equal to $7.5\times10^{-6}/°C$. Thus, it will be understood that the temperature dependency of the reflection wavelength depends upon both the variation in refractive index of the core and the change in grating period due to the thermal expansion but mostly results from the temperature-dependent variation of the refractive index.

As means for avoiding the above-mentioned variation in reflection wavelength, there is known a method in which the FBG is applied with tension depending upon the temperature change to thereby change the grating period so that a component resulting from the variation in refractive index is cancelled.

As a specific example of the above-mentioned method, proposal is made of a method in which the FBG is fixed to a temperature compensation member which comprises a combination of a material, such as an alloy or a silica glass, having a small coefficient of thermal expansion and a metal, such as aluminum, having a large coefficient of thermal expansion. Specifically, as illustrated in FIG. 1, an Invar (Registered Trademark) bar 10 having a small coefficient of thermal expansion has opposite ends provided with aluminum brackets 11a and 11b having a relatively large coefficient of thermal expansion attached thereto, respectively. An optical fiber 13 is fixed to the aluminum brackets 11a and 11b by the use of clasps 12a and 12b so that the optical fiber is stretched under a predetermined tension. At this time, adjustment is made so that a grating portion 13a of the optical fiber 13 is located between the two clasps 12a and 12b.

If the ambient temperature rises in the above-mentioned state, the aluminum brackets 11a and 11b are expanded to reduce the distance between the two clasps 12a and 12b so that the tension applied to the grating portion 13a of the optical fiber 13 is decreased. On the other hand, as the ambient temperature falls, the aluminum brackets 11a and 11b are contracted to increase the distance between the two clasps 12a and 12b so that the tension applied to the grating portion 13a of the optical fiber 13 is increased. Thus, by changing the tension applied to the FBG depending upon the temperature change, it is possible to adjust the grating period of the grating portion. As a result, it is possible to cancel the temperature dependency of the reflection center wavelength.

However, the above-mentioned temperature compensation device is disadvantageous in that the structure is complicated and the handling is difficult.

As a method for solving the above-mentioned problems, WO97/28480 discloses a method of controlling the tension applied to an FBG 15 by fixing the FBG 15 to a glass ceramics substrate 14 obtained by heat treating and crystallizing a mother glass material preliminarily shaped into a plate and having a negative coefficient of thermal expansion, as illustrated in FIG. 2. In FIG. 2, the reference numeral 16 represents a grating portion, 17, an adhered and fixed portion, and 18, a weight.

Since the temperature compensation can be carried out by the single member, the method disclosed in WO97/28480 is simple in mechanism and easy to handle. However, the glass ceramics used therein is highly devitrifiable so that a resultant shape is restricted to a simple shape such as a plate. In other words, the member having a complicated shape can not be produced.

In addition, Japanese Unexamined Patent Publication JP 10-96827 A discloses a temperature compensation member made of a Zr-tungstate system material or a Hf-tungstate system material and having a negative coefficient of thermal expansion. However, since these materials are very expensive, it is difficult to put the disclosed one into practical use as an industrial product. Furthermore, in this temperature compensation member, the coefficient of thermal expansion is too large in a negative direction. This makes it difficult to successfully cancel the temperature dependency of the reflection center wavelength of the FBG. The coefficient of thermal expansion of the above-mentioned temperature compensation member can be adjusted in a positive direction by addition of a material, such as $Al_2O_3$, having a positive coefficient of thermal expansion. However, addition of the material such as $Al_2O_3$ decreases the strength as a result of a large difference in expansion among the materials used. It is therefore difficult to put the disclosed one into practical use as an industrial product.

It is therefore an object of this invention to provide a temperature compensation member which has a negative coefficient of thermal expansion, which can be shaped into even a complicated shape, and which can be manufactured at a low cost.

It is another object of this invention to provide an optical communication device using the above-mentioned temperature compensation member.

DISCLOSURE OF THE INVENTION

In order to accomplish the above-mentioned object, the present inventors have made various experiments. As a result, it has been found out that, by sintering a large number of powder particles into a sintered body and including into the sintered body crystals exhibiting anisotropy in coefficient of thermal expansion, a temperature compensation member which has a negative coefficient of thermal expansion and which can be shaped into even a complicated shape can be manufactured at a low cost. Thus, this invention is proposed.

According to this invention, there is provided a temperature compensation member which comprises a sintered body obtained by firing at least one kind selected from a group including crystal powder, crystallizable glass powder, and partially-crystallized glass powder, which contains crystals exhibiting anisotropy in coefficient of thermal expansion, and which has a negative coefficient of thermal expansion.

According to this invention, there is provided a temperature compensation member which comprises a sintered body obtained by mixing at least one kind of powder selected from a group including crystal powder, crystallizable glass powder, and partially-crystallized glass powder and at least one additive selected from a group including amorphous glass powder, glass powder prepared by a sol-gel method, sol, and gel to obtain a mixture and firing the mixture, which contains crystals exhibiting anisotropy in coefficient of thermal expansion, and which has a negative coefficient of thermal expansion.

According to this invention, there is provided an optical communication device produced by the use of a temperature compensation member which comprises a sintered body obtained by firing at least one kind selected from a group including crystal powder, crystallizable glass powder, and partially-crystallized glass powder, which contains crystals exhibiting anisotropy in coefficient of thermal expansion, and which has a negative coefficient of thermal expansion.

According to this invention, there is provided an optical communication device produced by the use of a temperature compensation member which comprises a sintered body obtained by mixing at least one kind of powder selected from a group including crystal powder, crystallizable glass powder, and partially-crystallized glass powder and at least one additive selected from a group including amorphous glass powder, glass powder prepared by a sol-gel method, sol, and gel to obtain a mixture and firing the mixture, which contains crystals exhibiting anisotropy in coefficient of thermal expansion, and which has a negative coefficient of thermal expansion.

BEST MODE OF EMBODYING THE INVENTION

Figure 1:
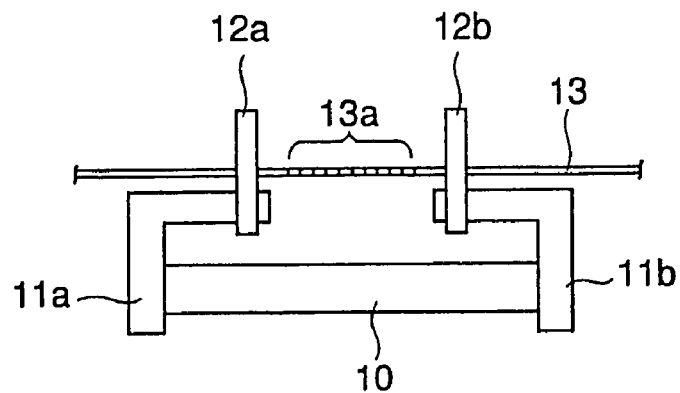
FIG. 1 is a front view showing an existing apparatus for preventing variation in reflection wavelength of an FBG in response to change in temperature.
Figure 2:
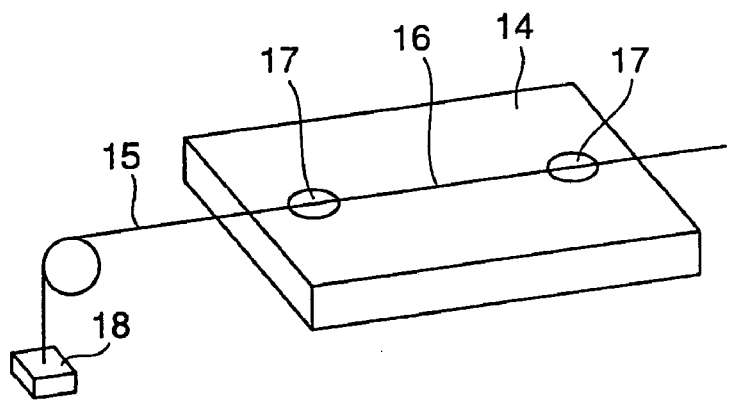
FIG. 2 is a perspective view showing a glass ceramics substrate having a negative coefficient of thermal expansion with an FBG fixed to its surface.

A temperature compensation member according to this invention is prepared by accumulating or integrating and then sintering a large number of one kind or two or more kinds of powder selected from a group including crystal powder, crystallizable glass powder, and partially-crystallized glass powder. Therefore, even a complicated shape can be easily formed at a low cost by a forming technique such as pressing, casting, and extrusion.

In a method of obtaining a glass ceramic having a negative coefficient of thermal expansion by melting a glass material, forming a desired shape, and carrying out heat treatment to cause crystallization as in WO97/28480 mentioned above, a glass melt is highly devitrifiable and can not be formed into a complicated shape as will presently be described.

In order that a resultant glass ceramic has a negative coefficient of thermal expansion sufficient for temperature compensation, the degree of crystallinity must approximate to 100% and the composition of a precipitated crystal must approximate to that of a pure crystal. Therefore, it is inevitable that the composition of a mother glass is highly analogous to the crystal composition. The melt of such a mother glass is extremely highly devitrifiable. In every stage of a series of forming processes including injection from a nozzle, casting, roll-out, and cooling, coarse crystals are often deposited to cause a large difference in expansion in the glass. This results in easy occurrence of surface cracks during forming or machining. Therefore, it is impossible not only to produce a product complicated in shape but also to perform production at a yield of an industrial level.

On the other hand, in case where the crystal powder is used, it is unnecessary to melt the glass but production is possible by simply sintering the crystal powder produced by an existing technique. If the crystallizable glass powder or the partially-crystallized glass powder is used, the glass or the glass ceramic is at first pulverized into powder and then sintered into a desired shape. Therefore, without taking devitrification of the molten glass into consideration, products having a complicated shape can be mass produced. Thus, use of the crystallizable glass powder or the partially-crystallized glass powder is free from the problem of decreasing the productivity because, even if the coarse crystals are deposited in the forming process, such coarse crystals are pulverized into fine particles in a pulverizing process to be homogenized.

Since the temperature compensation member of this invention contains crystals exhibiting anisotropy in coefficient of thermal expansion, a large number of microcracks are produced in a crystal grain boundary during cooling of crystal particles grown in a sintering process. Therefore, a negative coefficient of thermal expansion, specifically, $-10$ to $-120 \times 10^{-7}/°$ C. (preferably, $-30$ to $-90 \times 10^{-7}/°$ C.) is obtained as a whole in a temperature range between −40 and 100° C. If the temperature compensation member is used for an FBG, the tension corresponding to the change in temperature is applied to the FBG to vary the grating period so that a component resulting from the variation in refractive index can be cancelled.

In this invention, respective crystal particles having anisotropic coefficients of thermal expansion expand or contract in various directions according to the coefficients of thermal expansion in their crystal axis directions. As a result, the crystal particles are rearranged to increase the filling density and to increase contact areas between the particles. This promotes the tendency such that the crystal particles are fused to one another during heat treatment to minimize the surface energy. As a result, a ceramics member having high strength, specifically, bending strength of 10 MPa or more is obtained. In this invention, the powder preferably has a particle size of 50 μm or less so as to increase the contact area between the powder particles.

It is noted here that the crystal exhibiting anisotropy in coefficient of thermal expansion is a crystal having a negative coefficient of thermal expansion in at least one crystal axis direction and a positive coefficient in other axis directions. As the crystal powder in this invention, use may be made of powder of silicate represented by β-eucryptite, titanate such as $PbTiO_3$, phosphate such as $NbZr(PO_4)_3$, and oxide of La, Nb, V, or Ta. Among others, β-eucryptite crystal powder is suitable because the anisotropy in coefficient of thermal expansion is large. Furthermore, β-eucryptite crystal powder prepared by a so-called solid-phase method of mixing and firing a raw material powder is advantageous in that production at a low cost is possible because synthesis is carried out at a low temperature and pulverization is easy as compared with that prepared by a melting method in which the material is at first melted.

In this invention, it is preferable to mix the crystal powder and the crystallizable glass powder and/or the partially-crystallized glass powder prior to sintering. This is because the bending strength of the sintered body can be further improved. As regards the mixing ratio, 30–99 vol % of crystal powder and 1–70 vol % of crystallizable glass powder and/or partially-crystallized glass powder are appropriate.

In this invention, one kind or two or more kinds of powder selected from a group including crystal powder, crystallizable glass powder, and partially-crystallized glass powder and one kind or two or more kinds of additive selected from amorphous glass powder, glass powder prepared by a sol-gel method, sol, and gel may be mixed and then sintered. In this case, the firing temperature is lowered so as to achieve the improvement in workability and the reduction in cost. As regards the mixing ratio, 50–99.9 vol % of one kind or two or more kinds of crystal powder, crystallizable glass powder, and partially-crystallized glass powder and 0.1–50 vol % of one kind or two or more kinds of additive are appropriate.

It is noted here that the crystallizable glass powder is glass powder having a property such that crystals are precipitated inside as a result of heat treatment. The partially-crystallized glass powder is glass ceramic power such that the crystals have been precipitated in the glass. In this invention, another kind of crystal powder (for example, $Al_2O_3$ powder) different from the above-mentioned crystal powder may be mixed. In this event, the effects of further facilitating adjustment of the coefficient of thermal expansion, the strength, or the chemical properties is obtained.

In the temperature compensation member of this invention, a sintered body of a complicated shape can readily be prepared by a forming technique such as pressing, casting, and extrusion as described above. For example, a groove or a through hole for disposing an optical device can be easily formed at a predetermined position of the sintered body. In manufacture of an optical communication device, this provides greater advantages as follows.

For example, an optical fiber of an FBG is adhered and fixed to the temperature compensation member by the use of an adhesive. If the temperature compensation member has a groove or a through hole formed at a predetermined position thereof to locate an optical device, assembling is easily automated when the optical fiber is adhered. Therefore, the production cost is lowered. The groove or the through hole is not restricted to a single position but may be formed at a plurality of positions.

Generally, when a fiber-shaped optical device such as the FBG is fixed to the temperature compensation member, the optical device must preliminarily be applied with tension so that the optical device is not bent in case where the temperature compensation member is contracted to a length shorter than that when it is fixed. If the groove or the through hole has a diameter close to that of the optical device, the amount of the adhesive to be used can be reduced and the fixation can be achieved by a thin adhesive layer. Such a thin adhesive layer decreases a stress due to the difference in thermal expansion between the adhesive and each of the optical device and the temperature compensation member. This allows adhesion and fixation throughout the entire length of the groove or the through hole. In this event, even if the temperature compensation member contracts to the length shorter than that when it is fixed, the optical device is prevented from being bent or loosened. Therefore, the optical device with a temperature compensating function can be produced in a simpler process without requiring the tension to be preliminarily applied. In particular, in case where the temperature compensation member is provided with a precise through hole to receive the optical device to be inserted therethrough, the temperature compensation member also has a function as a component for positioning the optical device. Thus, the temperature compensation member itself serves as a connector component when the device with the temperature compensating function is connected to an optical fiber or another device.

As the adhesive for use in adhesion of the optical device to the temperature compensation member of this invention, low-melting-point glass frit or epoxy resin is suitable. Particularly, an adhesive comprising an alkali silicate aqueous solution (specifically, sodium silicate aqueous solution, potassium silicate aqueous solution) and inorganic powder (specifically, $Li_2O$—$Al_2O_3$—$SiO_2$ system glass ceramic powder with β-spodumene, β-spodumene solid solution, β-eucryptite, or β-quartz solid solution precipitated therein) is advantageous because long-term stability is excellent and adhesion is possible at a low temperature.

Now, this invention will be described in detail in conjunction with various examples and comparative examples.

EXAMPLE 1

Figure 3:
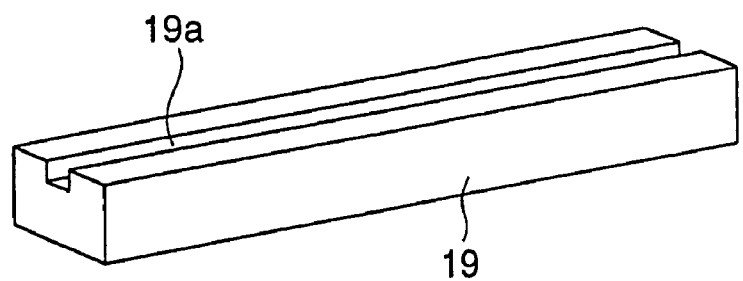
FIG. 3 is a perspective view showing a ceramics sintered body as a temperature compensation member of this invention.

At first, β-eucryptite crystals were pulverized to obtain crystal powder having an average particle size of 10 μm or less. Thereafter, the crystal powder was put into a mold and press-formed at a temperature of 20 MPa to produce a molded body (powder compact) 19 having a rectangular prism shape of 4 mm wide, 3 mm thick, and 40 mm long with a groove 19a of 1 mm wide and 1 mm deep formed on an upper surface thereof at the center in a longitudinal direction, as illustrated in FIG. 3.

Then, the molded body 19 was fired in air at 1300° C. for 2 hours to be sintered, and thereafter cooled down to a room temperature. Thus, a ceramics sintered body comprising β-eucryptite with a number of microcracks formed at a crystal grain boundary was obtained.

EXAMPLE 2

$Pb_{0.9}Ca_{0.1}(Fe_{0.5}Nb_{0.5})_{0.5}Ti_{0.5}O_3$ crystals were pulverized to obtain crystal powder having an average particle size of 10 μm or less. The crystal powder was press-formed in the manner similar to Example 1 to produce a molded body. The molded body was fired in air at 1320° C. for 1 hour to be sintered. Thus, a ceramics sintered body comprising $Pb_{0.9}Ca_{0.1}(Fe_{0.5}Nb_{0.5})_{0.5}Ti_{0.5}O_3$ with a number of microcracks formed at a crystal grain boundary was obtained.

EXAMPLE 3

At first, β-eucryptite crystals were pulverized to obtain crystal powder having an average particle size of 10 μm or less. Then, the crystal powder was mixed with 35%, by volume, of glass powder having the same average particle size, comprising $SiO_2$, $Al_2O_3$, and MgO as main components, and capable of precipitating cordierite when heated. Thereafter, press forming was performed in the manner similar to Example 1 to produce a molded body. The molded body was fired in air at 1300° C. for 10 hours to be sintered. Thus, a sintered body containing β-eucryptite solid solution with a number of microcracks formed at a crystal grain boundary was obtained.

EXAMPLE 4

At first, $NbZr(PO_4)_3$ crystals were pulverized to obtain crystal powder having an average particle size of 10 μm or less. Then, the crystal powder was mixed with 10% of $Al_2O_3$ powder having the same average particle size to obtain mixed powder. The mixed powder with water added thereto was kneaded into a slurry, poured into a gypsum mold having a predetermined shape, dried, and removed from the mold to produce a cast body. The cast body was fired in air at 1350° C. for 5 hours to be sintered. Thus, a sintered body similar in shape to Example 1 and containing $NbZr(PO_4)_3$ with a number of microcracks formed at a crystal grain boundary was obtained.

EXAMPLE 5

At first, β-eucryptite crystals were pulverized to obtain crystal powder having an average particle size of 10 μm or less. Then, the crystal powder was mixed with 35%, by volume, of glass powder having the same average particle size, comprising $SiO_2$, $Al_2O_3$, and $Li_2O$ as main components, and capable of precipitating β-eucryptite solid solution or β-spodumene solid solution when heated, to obtain mixed powder. The mixed powder was cast in the manner similar to Example 4 to produce a cast body. The cast body was fired in air at 1300° C. for 2 hours to be sintered. Thus, a sintered body containing β-eucryptite solid solution with a number of microcracks formed at a crystal grain boundary was obtained.

EXAMPLE 6

At first, β-eucryptite crystals were pulverized to obtain crystal powder having an average particle size of 10 μm or less. Then, the crystal powder was mixed with 30%, by volume, of $NbZr(PO_4)_3$ crystals having the same average particle size to obtain mixed powder. The mixed powder was press-formed in the manner similar to Example 1 to produce a molded body. The molded body was fired in air at 1300° C. for 5 hours to be sintered. Thus, a sintered body containing β-eucryptite crystals and $NbZr(PO_4)_3$ crystals with a number of microcracks formed at a crystal grain boundary was obtained.

EXAMPLE 7

At first, a glass material was prepared to have a composition of 46% $SiO_2$, 41% $Al_2O_3$, 9% $Li_2O$, 1% $TiO_2$, and 3% $ZrO_2$ by weight percent. The glass material was melted in a platinum crucible at 1550° C. for 6 hours, granulated in water, pulverized by a ball mill, and classified to obtain crystallizable glass powder having an average particle size of 10 μm.

Then, the crystallizable glass powder was press-formed in the manner similar to Example 1 to obtain a molded body. The molded body was heated at 1350° C. for 10 hours and thereafter cooled at a temperature falling rate of 200° C./hour to obtain a ceramics sintered body.

EXAMPLE 8

At first, a water-granulated glass having a composition similar to that in Example 7 was heated at 900° C. for 1 hour and then cooled at a temperature falling rate of 200° C./hour to obtain a partially-crystallized glass containing β-quartz solid solution crystals precipitated inside and having the degree of crystallinity of about 80%.

Then, the partially-crystallized glass was pulverized by a ball mill and classified to obtain partially-crystallized glass powder having an average particle size of 10 μm. The glass powder was press-formed in the manner similar to Example 1 to produce a molded body. The molded body was heated at 1350° C. for 10 hours and thereafter cooled at a temperature falling rate of 200° C./hour to obtain a ceramics sintered body.

EXAMPLE 9

β-eucryptite crystals were pulverized to obtain crystal powder having an average particle size of 10 μm. On the other hand, preparation was made of amorphous glass powder (average particle size of 10 μm) having a composition of 63% $SiO_2$, 6% $Na_2O$, 6% $Al_2O_3$, 20% $B_2O_3$, 2% $K_2O$, and 3% BaO by weight percent. Thereafter, 85 vol % of the crystal powder and 15 vol % of the amorphous glass powder were mixed, put into a mold, and press-formed at a pressure of 20 MPa to obtain a molded body similar to that in Example 1.

Then, the molded body was fired in air at 1000° C. for 1 hour to be sintered. Thus, a ceramics sintered body containing β-eucryptite crystals with a number of microcracks formed in a crystal phase was obtained.

EXAMPLE 10

$Pb_{0.9}Ca_{0.1}(Fe_{0.5}Nb_{0.5})_{0.5}Ti_{0.5}O_3$ crystals were pulverized to obtain crystal powder having an average particle size of 10 μm. On the other hand, preparation was made of crystallizable glass powder (average particle size of 10 μm) having a composition of 65% $SiO_2$, 22% $Al_2O_3$, 5% $Li_2O$, 2% $K_2O$, 2% $P_2O_5$, 1% MgO and 3% ZnO by weight percent and capable of precipitating β-quarts solid solution crystals inside when heated.

Thereafter, 85 vol % of the crystal powder and 15 vol % of the crystallizable glass powder were mixed, put into a mold, and press-formed at a pressure of 20 MPa to obtain a molded body similar to that in Example 1.

Then, the molded body was fired in air at 1200° C. for 3 hours to be sintered. Thus, a ceramics sintered body containing $Pb_{0.9}Ca_{0.1}(Fe_{0.5}Nb_{0.5})_{0.5}Ti_{0.5}O_3$ crystals and β-eucryptite crystals with a number of microcracks formed in a crystal phase was obtained.

EXAMPLE 11

Preparation was made of β-quartz solid solution powder having an average particle size of 10 μm. On the other hand, preparation was made of crystallizable glass powder (average particle size of 10 μm) having a composition of 67% $SiO_2$, 23% $Al_2O_3$, 5% $Li_2O$, 1.4% $P_2O_5$, 2.3% $ZrO_2$ and 1.3% $SnO_2$ by weight percent and capable of precipitating β-quarts solid solution crystals when heated.

Thereafter, 60 vol % of the crystal powder and 40 vol % of the crystallizable glass powder were mixed, put into a mold, and press-formed at a pressure of 20 MPa to obtain a molded body similar to that in Example 1.

Then, the molded body was fired in air at 1200° C. for 5 hours to be sintered. Thus, a ceramics sintered body having a β-quartz solid solution crystal phase with a number of microcracks was obtained.

EXAMPLE 12

80 vol % of β-eucryptite crystal powder similar to that in Example 1 and 20 vol % of $SiO_2$ glass powder (average particle size of 5 μm) prepared by a sol-gel method were mixed to obtain mixed powder. The mixed powder with water added thereto was kneaded into a clay-like material and then subjected to extrusion to produce a tubular molded body having an outer diameter of 3 mm and an inner diameter of 0.3 mm.

Then, the molded body was fired in air at 1200° C. for 12 hours to be sintered. Thus, a ceramics sintered body containing a number of β-eucryptite crystals with a number of microcracks formed in a crystal was obtained.

EXAMPLE 13

60 wt % of β-eucryptite crystal powder similar to that in Example 1 and 40 wt % of $Al(OC_4H_9)_3$ solution having a concentration of 10% were mixed to obtain a mixed material. The mixed material was dried at a temperature of 120° C., put into a mold, and press-formed at a temperature of 20 MPa to obtain a molded body similar to that in Example 1.

Then, the molded body was fired in air at 900° C. for 5 hours to be sintered. Thus, a ceramics sintered body containing β-eucryptite crystals and alumina crystals with a number of microcracks formed in a crystal phase was obtained.

EXAMPLE 14

80 vol % of $NbZr(PO_4)_3$ crystals having an average particle size of 15 μm and 20 vol % of amorphous glass powder (average particle size of 10 μm) comprising 65% $SiO_2$, 6% $Al_2O_3$, 1% $Li_2O$, 20% $B_2O_3$, 3% BaO, 0.5% F, 2.5% $Na_2O$, and 2% $K_2O$ by weight percent were mixed to obtain mixed powder. The mixed powder was put into a mold and press-formed at a pressure of 20 MPa to obtain a molded body similar to that in Example 1.

Then, the molded body was fired in air at 1100° C. for 2 hours to be sintered. Thus, a ceramics sintered body containing $NbZr(PO_4)_3$ crystals with a number of microcracks formed in a crystal was obtained.

EXAMPLE 15

50 vol % of $SnO_2$ crystal powder having an average particle size of 5 μm and 50 vol % of partially-crystallized glass powder with 80 vol % of β-eucryptite crystals precipitated therein were mixed to obtain mixed powder. The mixed powder was put into a mold and press-formed at a pressure of 20 MPa to obtain a molded body similar to that in Example 1.

Then, the molded body was fired in air at 1300° C. for 10 hours to be sintered. Thus, a ceramics sintered body containing $SnO_2$ crystals and β-eucryptite crystals with a number of microcracks formed in a crystal was obtained.

EXAMPLE 16

55 vol % of β-eucryptite crystal powder similar to that in Example 1 and crystallizable glass powder (average particle size of 10 μm) having a composition of 65% $SiO_2$, 22% $Al_2O_3$, 5% $Li_2O$, 2% $K_2O$, 2% $P_2O_5$, 1% MgO and 3% ZnO by weight percent and capable of precipitating β-quarts solid solution crystals inside when heated were mixed to obtain mixed powder. The mixed powder was put into a mold and press-formed at a pressure of 20 MPa to obtain a molded body similar to that in Example 1.

Then, the molded body was fired in air at 1250° C. for 5 hours to be sintered. Thus, a ceramics sintered body containing β-eucryptite crystals with a number of microcracks formed in a crystal phase was obtained.

COMPARATIVE EXAMPLE 1

A glass melt in which a mol ratio of $Li_2O:Al_2O_3:SiO_2$ is 1:1:2 was poured into a mold, cooled, formed into a shape similar to that in Example 1, and fired at 1300° C. for 15 hours to obtain a glass ceramic comprising β-eucryptite crystals with a number of microcracks contained in a crystal phase.

COMPARATIVE EXAMPLE 2

60 vol % of $SnO_2$ powder having an average particle size of 10 μm and 40 vol % of glass powder having an average particle size of 10 μm, comprising $SiO_2$, $Al_2O_3$, and $Li_2O$ as main components, and capable of precipitating β-quartz solid solution or β-spodumene solid solution when heated were mixed to obtain mixed powder. The mixed powder was put into a mold and press-formed at a pressure of 20 MPa into a shape similar to that in Example 1 to produce a molded body. The molded body was fired in air at 1400° C. for 15 hours to be sintered. Thus, a ceramics sintered body was obtained. The sintered body contained $SnO_2$ crystals but no microcracks were formed in a crystal phase.

COMPARATIVE EXAMPLE 3

SnO$_2$ powder having an average particle size of 5 μm was press-formed into a shape similar to that in Example 1 to obtain a molded body. The molded body was fired in air at 1400° C. for 15 hours to be sintered. Thus, a ceramics sintered body was obtained. The sintered body contained SnO$_2$ crystals but no microcracks were formed in a crystal.

The ceramics sintered bodies in Examples and Comparative Examples obtained as mentioned above were measured for the coefficient of thermal expansion and the bending strength. The result is shown in Table 1.

TABLE 1

|  | Coefficient of Thermal Expansion (×10$^{-7}$/° C.) | Bending Strength (MPa) | Formability |
|---|---|---|---|
| Example 1 | −80 | 15 | good |
| Example 2 | −45 | 20 | good |
| Example 3 | −66 | 30 | good |
| Example 4 | −51 | 25 | good |
| Example 5 | −78 | 30 | good |
| Example 6 | −60 | 25 | good |
| Example 7 | −69 | 28 | good |
| Example 8 | −69 | 28 | good |
| Example 9 | −72 | 45 | good |
| Example 10 | −55 | 30 | good |
| Example 11 | −45 | 20 | good |
| Example 12 | −85 | 35 | good |
| Example 13 | −80 | 20 | good |
| Example 14 | −40 | 40 | good |
| Example 15 | −30 | 20 | good |
| Example 16 | −80 | 20 | good |
| Comparative Example 1 | −80 | 20 | no good |
| Comparative Example 2 | +30 | 25 | good |
| Comparative Example 3 | +40 | 20 | good |

As is clear from Table 1, the ceramics sintered body in each Example has a negative coefficient of thermal expansion between −30 to −85×10$^{-7}$/° C. and a high bending strength of 15 MPa or more. Furthermore, the ceramics sintered body is suitable as the temperature compensation member used in the FBG because a groove having a predetermined shape is formed.

On the other hand, the glass ceramic in Comparative Example 1 exhibits remarkable devitrification upon forming to deposit coarse crystals and to form a large number of cracks on its surface. The ceramics sintered bodys in each of Comparative Examples 2 and 3 has a positive coefficient of thermal expansion and can not be used as the temperature compensation member.

It is noted here that the coefficients of thermal expansion in Table 1 were measured by a dilatometer in a temperature range between −40 and 100° C. The bending strength was measured by a three-point bending test according to JIS R1601 after each ceramics sintered body is shaped into a plate of 3 mm×4 mm×35 mm. As regards the formability, "good" represents the case where the molded body shown in FIG. 1 was accurately prepared while "no good" represents the case where the molded body could not accurately be prepared and had cracks formed on its surface. Identification of the crystal phase was examined by X-ray diffraction. By the use of a scanning electron microscope, presence or absence of microcracks was observed.

The temperature compensation member in each of the above-mentioned Examples 1 to 16 has a negative coefficient of thermal expansion and, even if the shape is complicated, can easily be formed at a low cost.

INDUSTRIAL APPLICABILITY

The temperature compensation member of this invention is suitable as a temperature compensation member of an optical communication device such as an FBG, a coupler, and a waveguide.

The invention claimed is:

1. A method of manufacturing a temperature compensation member, comprising:
   preparing at least one powder selected from a group including crystal powder, crystallizable glass powder, and partially-crystallized glass powder;
   preparing at least one additive selected from a group including amorphous glass powder, glass powder prepared by a sol-gel method, sol, and gel;
   mixing said at least one powder and said at least one additive to produce a mixture; and
   firing the mixture to produce said temperature compensation member of a sintered body which contains crystals exhibiting anisotropy in coefficient of thermal expansion and has a negative coefficient of thermal expansion.

2. The method according to claim 1, wherein said crystal powder is at least one kind of powder selected from a group including silicate, phosphate, titanate, and oxides of La, Nd, V, and Ta.

3. The method according to claim 1, wherein said crystal powder is β-eucryptite crystal powder prepared by a solid-phase method.

4. The method according to claim 1, wherein said powder has an average particle size of 50 μm or less.

5. The method according to claim 1, wherein the coefficient of thermal expansion falls within a range of −10 to −120×10$^{-7}$/° C. in a temperature range of −40 to 100° C.

6. The method according to claim 1, wherein said at least one power is of 50–99.9 vol %, said additive being of 0.1–50 vol %.

7. A method of manufacturing a temperature compensation member, comprising firing at least one of crystallizable glass powder and partially-crystallized glass powder to produce said temperature compensation member of a sintered body which contains crystals exhibiting anisotropy in coefficient of thermal expansion and has a negative coefficient of thermal expansion.

8. The method according to claim 7, wherein said powder has an average particle size of 50 μm or less.

9. The method according to claim 7, wherein the coefficient of thermal expansion falls within a range of −10 to −120× 10$^{-7}$/° C. in a temperature range of −40 to 100° C.

10. The method according to claim 7, further comprising:
    preparing at least one additive selected from a group including amorphous glass powder, glass powder prepared by a sol-gel method, sol, and gel; and
    mixing said at least one additive with said at least one.

11. A method of manufacturing a temperature compensation member, comprising:
    preparing crystal powder;
    preparing at least one additive selected from a group including amorphous glass powder, glass powder prepared by a sol-gel method, sol, and gel;
    mixing said crystal powder and said at least one additive to produce a mixture; and
    firing the mixture to produce said temperature compensation member of a sintered body which contains crystals exhibiting anisotropy in coefficient of thermal expansion and has a negative coefficient of thermal expansion.

12. The method according to claim 11, wherein said crystal powder is at least one kind of powder selected from a group including silicate, phosphate, titanate, and oxides of La, Nd, V, and Ta.

13. The method according to claim 11, wherein said crystal powder is β-eucryptite crystal powder prepared by a solid-phase method.

14. The method according to claim 11, wherein said powder has an average particle size of 50 $\mu$m or less.

15. The method according to claim 11, wherein the coefficient of thermal expansion falls within a range of $-10$ to $-120 \times 10^{-7}/°$ C. a temperature range of $-40$ to $100°$ C.

16. The method according to claim 11, wherein said crystal power is of 50–99.9 vol %, said additive being of 0.1–50 vol %.

17. A method of manufacturing a temperature compensation member comprising:
preparing crystal powder;
preparing at least one of crystallizable glass powder and partially-crystallized glass powder;
firing said crystal powder and said at least one to produce a mixture; and
firing the mixture to produce said temperature compensation member of a sintered body which contains crystals exhibiting anisotropy in coefficient of thermal expansion and has a negative coefficient of thermal expansion.

18. The method according to claim 17, wherein said crystal powder is at least one kind of powder selected from a group including silicate, phosphate, titanate, and oxides of La, Nd, V, and Ta.

19. The method according to claim 17, wherein said crystal powder is β-eucryptite crystal powder prepared by a solid-phase method.

20. The method according to claim 17, wherein said powder has an average particle size of 50 $\mu$m or less.

21. The method according to claim 17, wherein the coefficient of thermal expansion falls within a range of $-10$ to $-120 \times 10^{-7}/°$ C. a temperature range of $-40$ to $100°$ C.

22. The method according to claim 17, wherein said crystal powder is of 30–99 vol %, said at least one being of 1–70 vol %.

23. The method according to claim 17, further comprising:
preparing at least one additive selected from a group including amorphous glass powder, glass powder prepared by a sol-gel method, sol, and gel; and
mixing said at least one additive with said at least one.

* * * * *